United States Patent
Bauchot et al.

(10) Patent No.: US 8,418,161 B2
(45) Date of Patent: Apr. 9, 2013

(54) SYSTEM AND METHOD FOR LOADING A CALLED CLASS FILE TABLE WITH DATA INDICATING A HIGHEST VERSION OF A CLASS FILE

(75) Inventors: Frederic Bauchot, Saint-Jeannet (FR); Gerard Marmigere, Drap (FR); Joaquin Picon, St. Laurent du Var (FR); Vincent Tassy, Cagnes sur mer (FR)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/325,470

(22) Filed: Dec. 1, 2008

(65) Prior Publication Data

US 2010/0131478 A1 May 27, 2010

(30) Foreign Application Priority Data

Nov. 24, 2008 (EP) .................................... 08305830

(51) Int. Cl.
G06F 15/76 (2006.01)
G06F 15/00 (2006.01)
(52) U.S. Cl.
USPC ........................................................ 717/165
(58) Field of Classification Search ........................ None
See application file for complete search history.

(56) References Cited

U.S. PATENT DOCUMENTS

| | | | | |
|---|---|---|---|---|
| 5,974,428 A | * | 10/1999 | Gerard et al. ................. | 717/170 |
| 6,175,855 B1 | | 1/2001 | Reich et al. | |
| 6,272,674 B1 | * | 8/2001 | Holiday, Jr. .................... | 717/174 |
| 6,442,753 B1 | | 8/2002 | Gerard et al. | |
| 6,826,750 B1 | | 11/2004 | Curtis et al. | |
| 7,131,122 B1 | | 10/2006 | Lakhdhir | |
| 8,006,240 B2 | * | 8/2011 | Bhatkhande et al. ......... | 717/169 |
| 8,122,446 B2 | * | 2/2012 | Moore et al. .................. | 717/174 |
| 2007/0168956 A1 | * | 7/2007 | Moore et al. .................. | 717/120 |
| 2007/0169103 A1 | * | 7/2007 | Bhatkhande et al. ......... | 717/170 |

FOREIGN PATENT DOCUMENTS

EP 1267259 A2 12/2002

* cited by examiner

*Primary Examiner* — Corey S Faherty
(74) *Attorney, Agent, or Firm* — Cantor Colburn LLP; Jean Sullivan (57) ABSTRACT

A system and a method for loading a called class file table with data indicating a highest version of a class file of a software application are provided. The method includes retrieving a first class version dependency file associated with a first class file, having both a first class name and a first version number associated with a second class file that is called by the first class file. The method further includes adding a first record to the called class file table having both the first class name and the first version number associated with a second class file, and retrieving a second class version dependency file associated with a third class file. The second class version dependency file has both a second class name and a second version number associated with a fourth class file called by the third class file. The method further includes if the second class name is identical to the first class name in the called class file table and the second version number is higher than the first version number, then updating the first record in the called class file table with the second class name and the second version number.

4 Claims, 12 Drawing Sheets

CALLED CLASS FILE TABLE 52

| CLASS NAME | VERSION |
|---|---|
| A | 01.02.01 |
| B | 01.01.03 |
| C | 02.01.01 |
| D | 01.01.03 |
| E | 01.01.03 |
| F | 01.02.01 |
| G | 01.01.03 |
| H | 01.01.04 |

193 — CLASS NAME
194 — VERSION
195 — F ← HIGHEST VERSION FOUND FOR F CLASS
196 — G

SYSTEM AND METHOD FOR LOADING A CALLED CLASS FILE TABLE WITH DATA INDICATING A HIGHEST VERSION OF A CLASS FILE

CROSS REFERENCE TO RELATED APPLICATIONS

This application claims priority to European application number EP08305830.5, filed Nov. 24, 2008, the contents of which are incorporated herein by reference in its entirety.

BACKGROUND

The present application is directed to a system and a method for loading a called class file table with data indicating a highest version of a class file of a software application.

During runtime, class files are loaded into a memory device when an instance of a class occurs. In particular, a first class file can be loaded into the memory device. Thereafter, if another class file calls the first class file but expects that the first class file is an updated version but is actually not an updated version, a software exception error can undesirably occur.

Accordingly, the inventors herein have recognized a need for a system and a method that loads a called class file table with data indicating a highest version of a class file utilizing by a software algorithm.

SUMMARY

A method for loading a called class file table with data indicating a highest version of a class file of a software application in accordance with an exemplary embodiment is provided. The method includes retrieving a first class version dependency file associated with a first class file. The first class version dependency file has both a first class name and a first version number associated with a second class file that is called by the first class file. The method further includes adding a first record to the called class file table having both the first class name and the first version number associated with a second class file. The method further includes retrieving a second class version dependency file associated with a third class file. The second class version dependency file has both a second class name and a second version number associated with a fourth class file called by the third class file. The method further includes if the second class name is identical to the first class name in the called class file table and the second version number is higher than the first version number, then updating the first record in the called class file table with the second class name and the second version number associated with the fourth class file.

A system for loading a called class file table with data indicating a highest version of a class file of a software application in accordance with another exemplary embodiment is provided. The system includes a memory device and a computer operably communicating with the memory device. The computer is configured to retrieve a first class version dependency file associated with a first class file from the memory device. The first class version dependency file has both a first class name and a first version number associated with a second class file that is called by the first class file. The computer is further configured to add a first record to the called class file table having both the first class name and the first version number associated with a second class file. The computer is further configured to retrieve a second class version dependency file associated with a third class file. The second class version dependency file has both a second class name and a second version number associated with a fourth class file called by the third class file. The computer is further configured to update the first record in the called class file table with the second class name and the second version number associated with the fourth class file if the second class name is identical to the first class name in the called class file table and the second version number is higher than the first version number.

DETAILED DESCRIPTION

Figure 1:
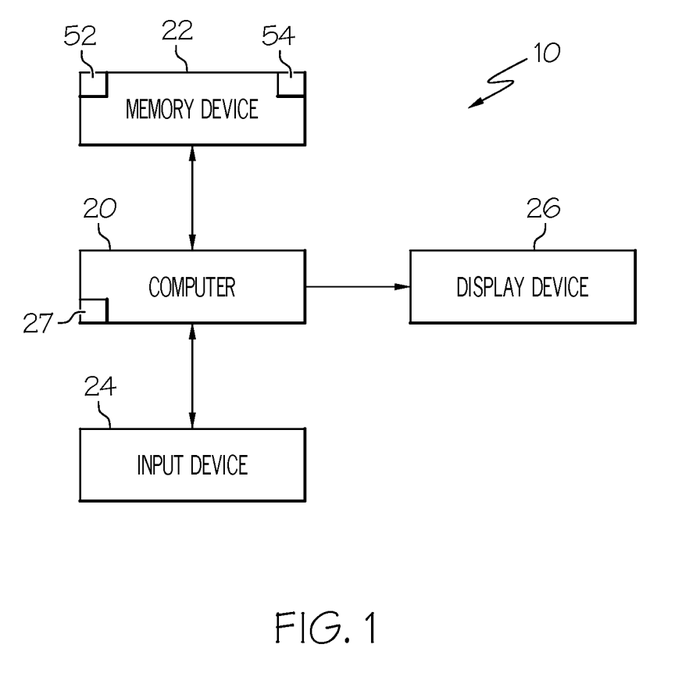
FIG. 1 is a schematic of a system for loading a called class file table with data indicating a highest version of a class file utilized by a software application in accordance with an exemplary embodiment.

Referring to FIG. 1, a system 10 for loading a called class file table with data indicating a highest version of a class file of a software application, in accordance with an exemplary embodiment is illustrated. The system 10 includes a computer 20, a memory device 22, an input device 24, and a display device 26. For purposes of understanding, the term "class" refers an object-oriented class. The term "class file" refers to an executable file or object instantiated from a class. The term "class name" refers to an identifier utilized to identify a class, such as a class "A" for example. The term "version number" refers to a version number associated with a class or class file. A class file can have a class file name formed utilizing a class name and a version number. For example, a class file named D_00.01.02 belongs to a class "D" with a version number of 00.01.02.

In one exemplary embodiment, Java classes and class files are discussed. However, it should be understood that the present embodiments could be implemented utilizing any type of classes or class files.

The computer 10 is configured to preprocess class files of a software application and to load a called class file table 170 with data indicating a highest version of class files for all classes in a software application that will be explained in greater detail below. The computer 10 is further configured to detect a version conflict between a requested class file and a loaded class file during runtime that will be explained in greater detail below.

Figure 2:
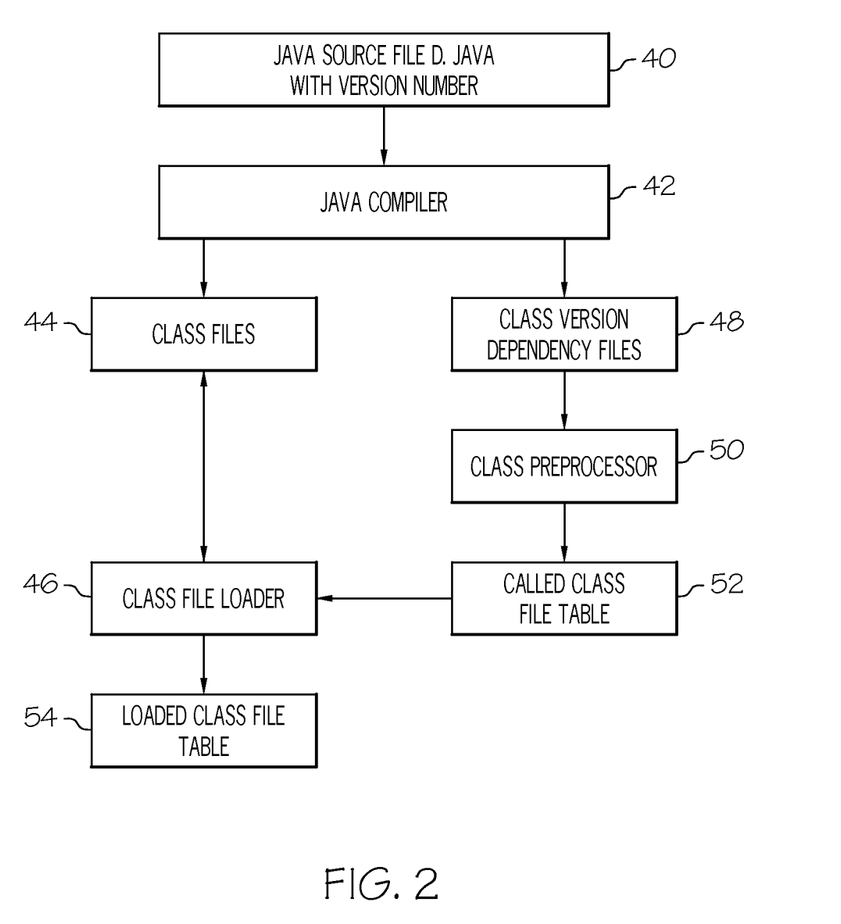
FIG. 2 is a schematic of files and software applications utilized by the system of FIG. 1.

Referring to FIG. 2, exemplary software applications and files utilized by the system 10 will now be explained. The Java source file 40, also referred to as D.java, is received by the Java compiler 42. The compiler 42 compiles the Java source file 140 and generates class files 44. A developer develops class version dependency files 48 such that one class version dependency file is developed for each class file. Each class version dependency file indicates class names and version numbers associated with class files, called by a calling class file. The class preprocessor 50 reads the class version dependency files 48 and loads records in a called class file table 52 with class names and version numbers. The class file loader 46 reads the class files 44 and the called class file table 52 to determine which class files to load into a local memory 27 for execution thereof and to update a loaded class file table 54 indicating the class files loaded into the local memory or random-access memory 27 of the computer 20, for execution thereof.

Figure 3:
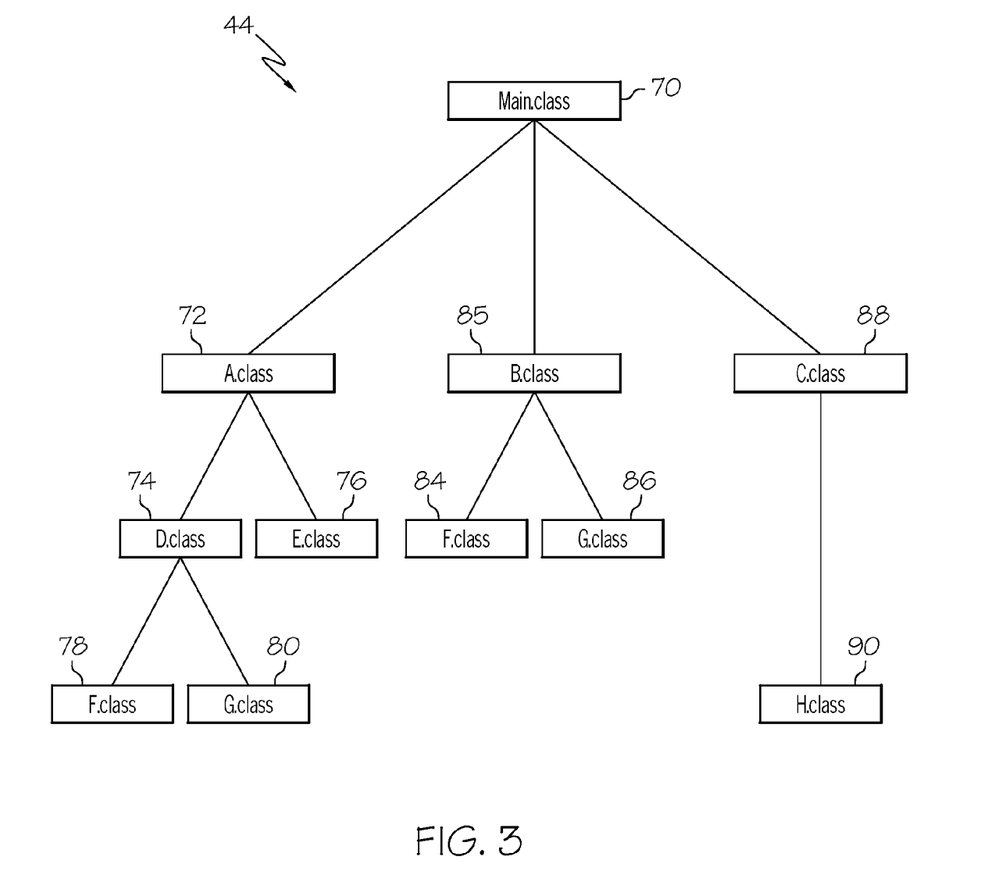
FIG. 3 is a schematic of an exemplary tree structure of class files of a Java application.

Referring to FIGS. 2 and 3, an exemplary Java application comprising class file 44 will now be explained. In particular, the class files 44 are compiled files of associated routines within the Java source file 40. As shown, the class files 44 includes a class file 70 referred to as main.class, a class file 72 referred to as A.class, a class file 74 referred to as D.class, a class file 76 referred to as E.class, a class file 78 referred to as F.class, a class file 80 referred to as G.class, a class file 82 referred to as B.class, a class file 84 referred to as F.class, a class file 86 referred to as G.class, a class file 88 referred to as C.class, and a class file 90 referred to as H.class.

During operation, the Java application executes main.class that utilizes the following class files: A.class, B.class C.class. The class file A.class calls the class files D.class and E.class. The class file B.class calls the class files F.class and G.class. Further, the class file D.class calls the class files F.class and G.class. As shown, some class files may be used by different classes. For example, the class files F.class and G.class are utilized by both the D.class and B.class.

Figure 4:
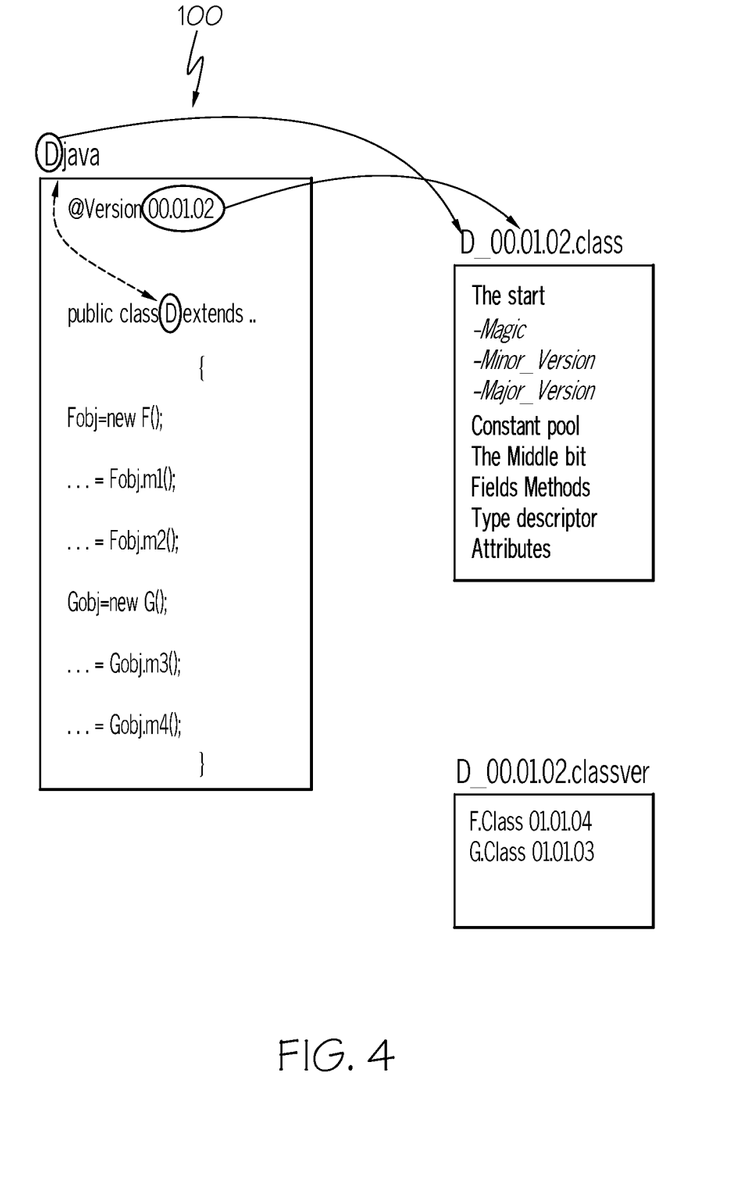
FIG. 4 is a schematic of an exemplary Java source file, a class file, and a class version dependency file utilized by the system of FIG. 1.

Referring to FIGS. 2 and 4, an explanation of how a class file and a class version dependency file are developed will now be provided. As shown, the class file 100 also referred to as D.java has a version number tag "@version 00.01.02" where the version number is 00.01.02. Further, the class file 100 is identified as a class "D" file utilizing the declaration "public class D." The Java compiler 42 utilizes the version number tag and the declaration in the class file 100 to generate a class file named D_00.01.02.class. Further, a developer develops a class version dependency file based on the version number tag and the declaration in the class file 100 to generate a version dependency file named "D_00.01.02.classver." The dependency file D_00.01.02.classver identifies class files that are called by the class file D_00.01.02.class.

Figure 5:
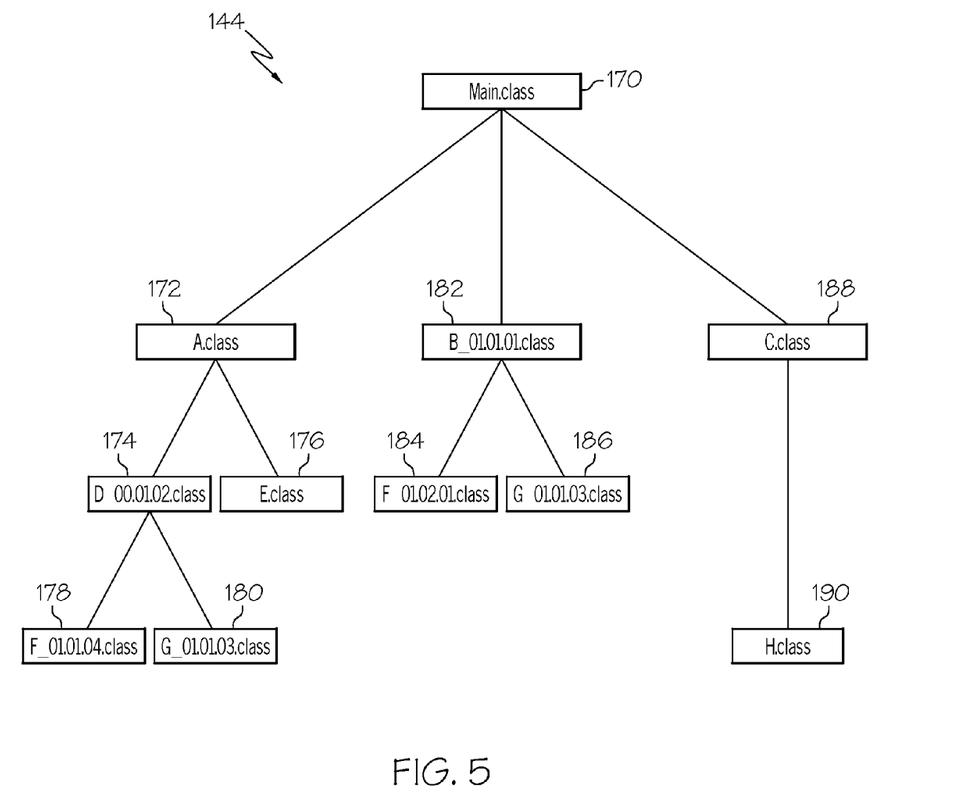
FIG. 5 is a schematic of an exemplary tree structure of class files of a Java application.

Referring to FIG. 5, an explanation of an exemplary Java application comprising class files 144 will now be explained. In particular, the class files 144 are compiled files of associated routines within a Java source file. As shown, the class files 144 includes a class file 170 referred to as main.class, a class file 172 referred to as A.class, a class file 174 referred to as D_00.01.02.class, a class file 176 referred to as E.class, a class file 178 referred to as F_01.01.04.class, a class file 180 referred to G_01.01.03.class, a class file 182 referred to as B_01.01.01.class, a class file 184 referred to as F_01.02.01.class, a class file 186 referred to as G_01.01.03.class, a class file 188 referred to as C.class, and a class file 190 referred to as H.class.

As shown, the application utilizes two "F" class files (F_01.01.04.class and F_01.02.01.class) that are different versions from one another. Further, the application utilizes two "G class files (G_01.01.03.class and G_01.01.03.class) that are different versions from one another.

Figure 6:
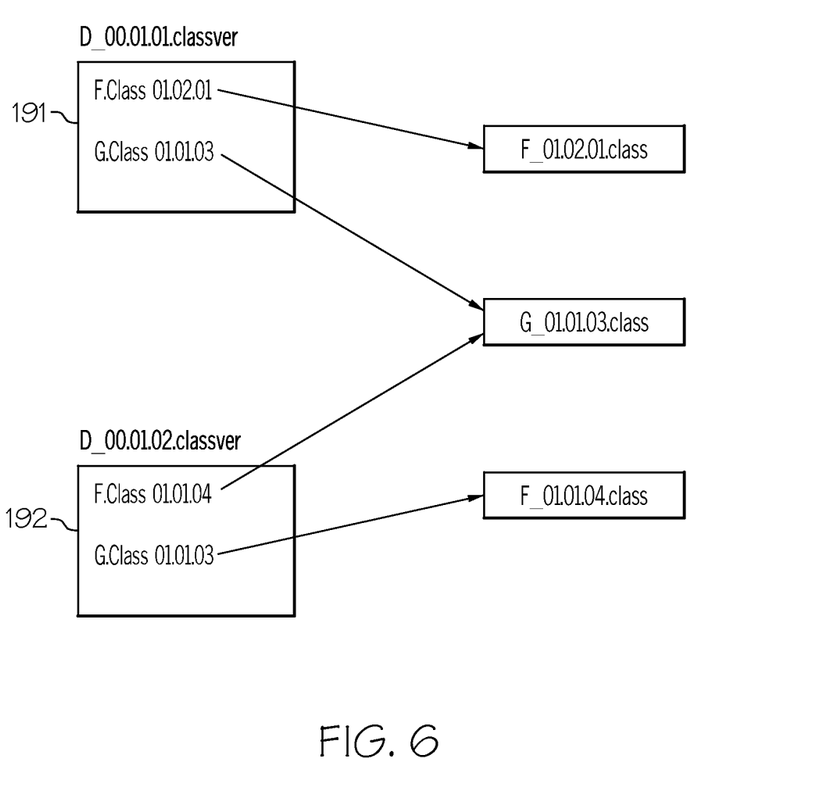
FIG. 6 is a schematic of first and second exemplary class dependency files utilized by the system of FIG. 1.

Referring to FIGS. 5 and 6, class version dependency files generated for the class files 144 will now be explained. As shown, a software developer can develop a class version dependency file 191, referred to as B_01.01.01.classver, that indicates the class files that are called by the class file B_01.01.01.class. The record "F.class 01.02.01" corresponds to the class file F_01.02.01.class, and the record "G.class 01.01.03" corresponds to the class file G_01.01.03.class.

Further, the software developer can develop a class version dependency file 192, referred to as D_01.01.02.classver, that indicates the class files that are called by the class file D_01.01.02.class. The record "F.class 01.01.04" corresponds to the class file F_01.01.04.class, and the record "G.class 01.01.03" corresponds to the class file G_01.01.03.class.

Figure 7:
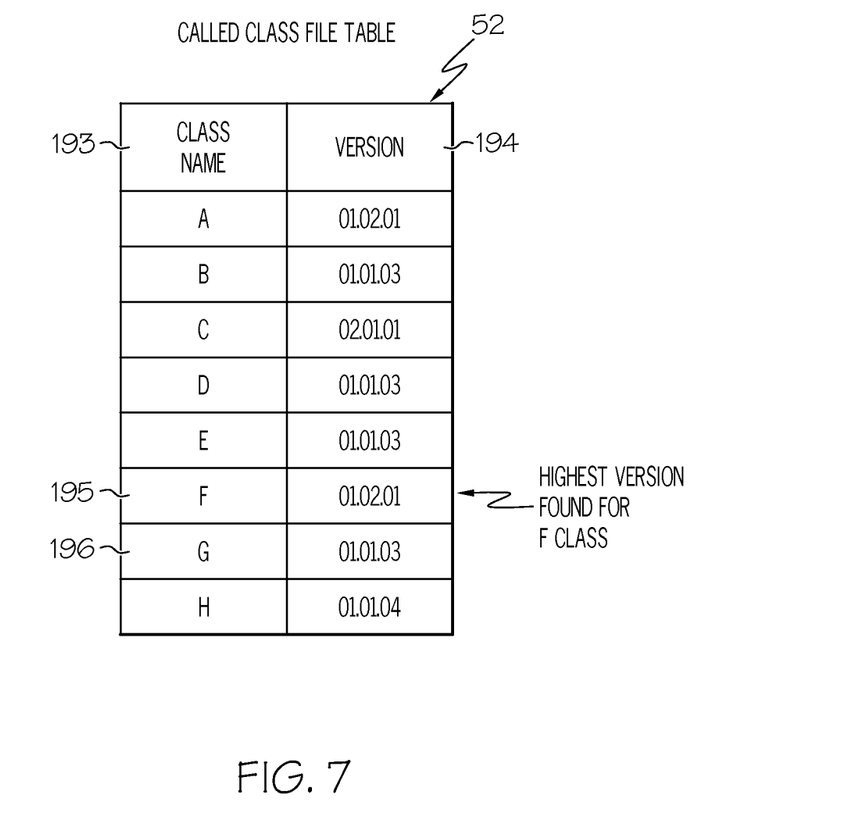
FIG. 7 is a schematic of an exemplary called class file table utilized by the system of FIG. 1.

Referring to FIGS. 6 and 7, the Java compiler 42 can read the files 192, 194 to determine that the highest version of the F class files is F_01.02.01.class. Further, the compiler 42 can write the record 195 to the called class table 52 having a name field 193 with "F" indicating an F class file, and a version number field with 01.02.01. Further, the Java compiler 42 can read the files 192, 194 to determine that the highest version of the G class file is G_01.01.03.class. Further, the compiler 42 can write the record 196 to the called class table 52 having a name field 193 with "G" indicating a G class file, and a version number field with 01.01.03.

Figure 8:
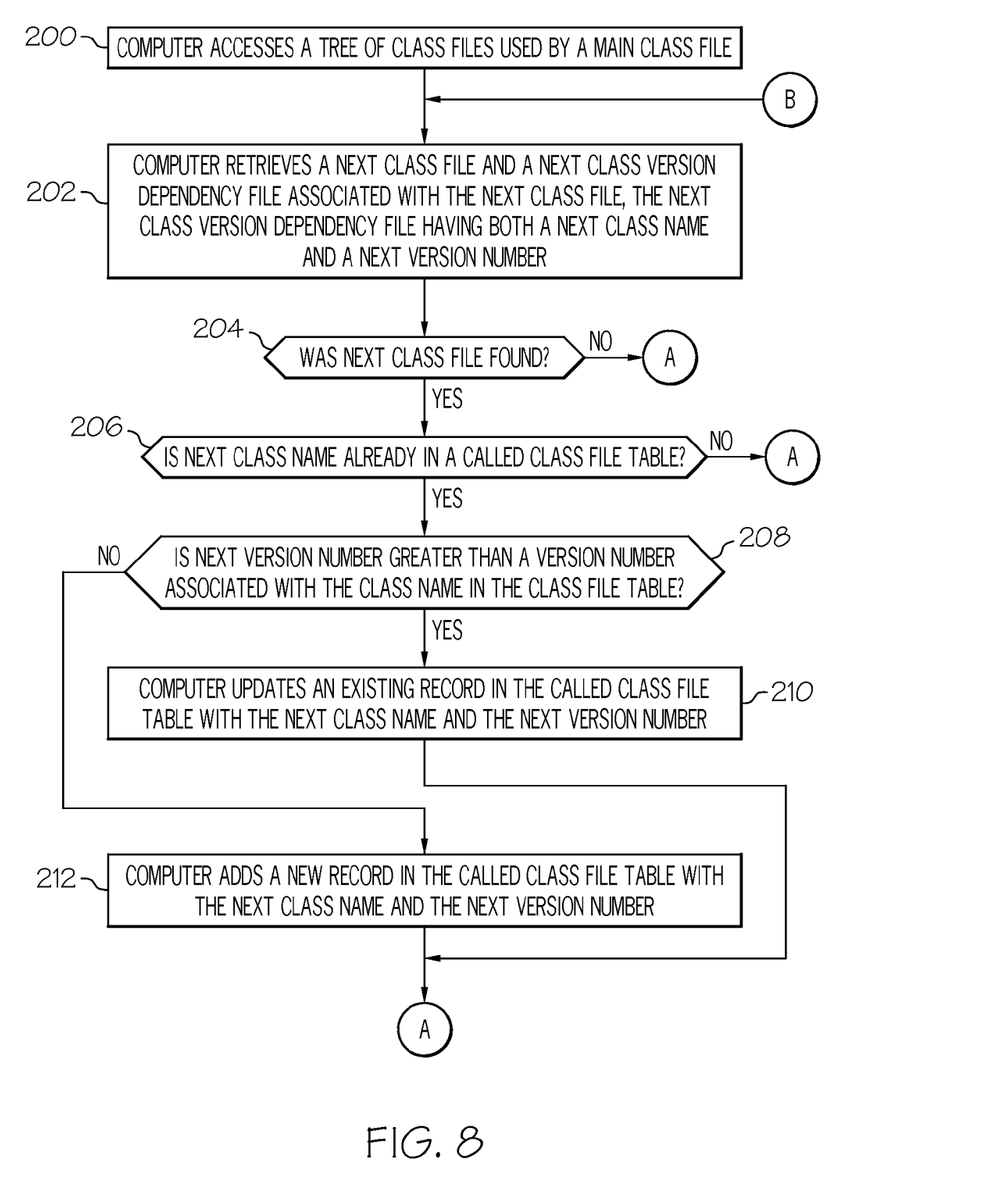
FIGS. 8 and 9 are flowcharts for a method for loading a called class file table with data indicating a highest version of a software application in accordance with another exemplary embodiment.
Figure 9:
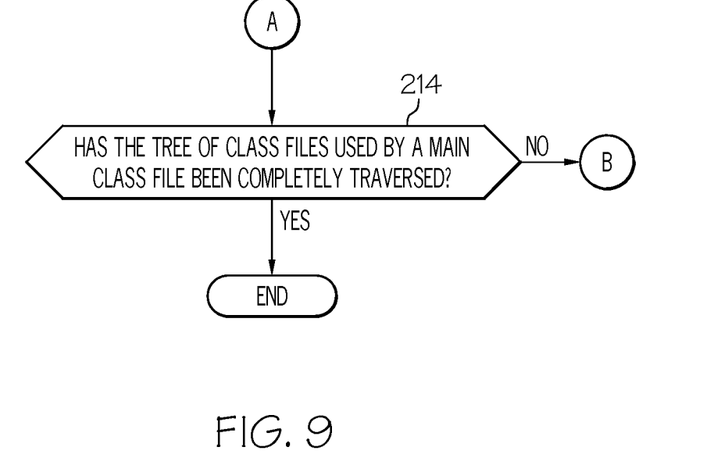

Referring to FIGS. 8 and 9, a flowchart of a method for loading the called class file table 52 with data indicating a highest version of a class file of a software application in accordance with an exemplary embodiment is illustrated.

At step 200, the computer 20 accesses a tree of class files used by a main class file.

At step 202, the computer 20 retrieves a next class file and a next class version dependency file associated with the next class file. The next class version dependency file has both a next class name and a next version number.

At step 204, the computer 20 makes a determination as to whether the next class file was found. If the value of step 204 equals "yes", the method advances to step 214. Otherwise, the method advances to step 206.

At step 206, the computer 20 makes a determination as to whether the next class name is already in the called class file table 52. If the value of step 206 equals "yes", the method advances to step 208. Otherwise, the method advances to step 214.

At step 208, the computer 20 makes a determination as to whether a next version number is greater than a version number associated with the class name in the class file table 52. If the value of step 208 equals "yes", the method advances to step 210. Otherwise, the method advances to step 212.

At step 210, the computer 20 updates an existing record in the called class file table 52 with the next class name and the next version number. After step 210, the method advances to step 214.

Referring in the step 208, the value of step 208 equals "no", the method advances to step 212. At step 212, the computer 20 adds a new record in the called class file table 52 with the next class name and the next version number. After step 212, the method advances to step 214.

At step 214, computer 20 makes a determination as to whether the tree of class files used by a main class file has been completely traversed. If the value of step 214 equals "yes", the method is exited. Otherwise, the method returns to step 202.

Figure 10:
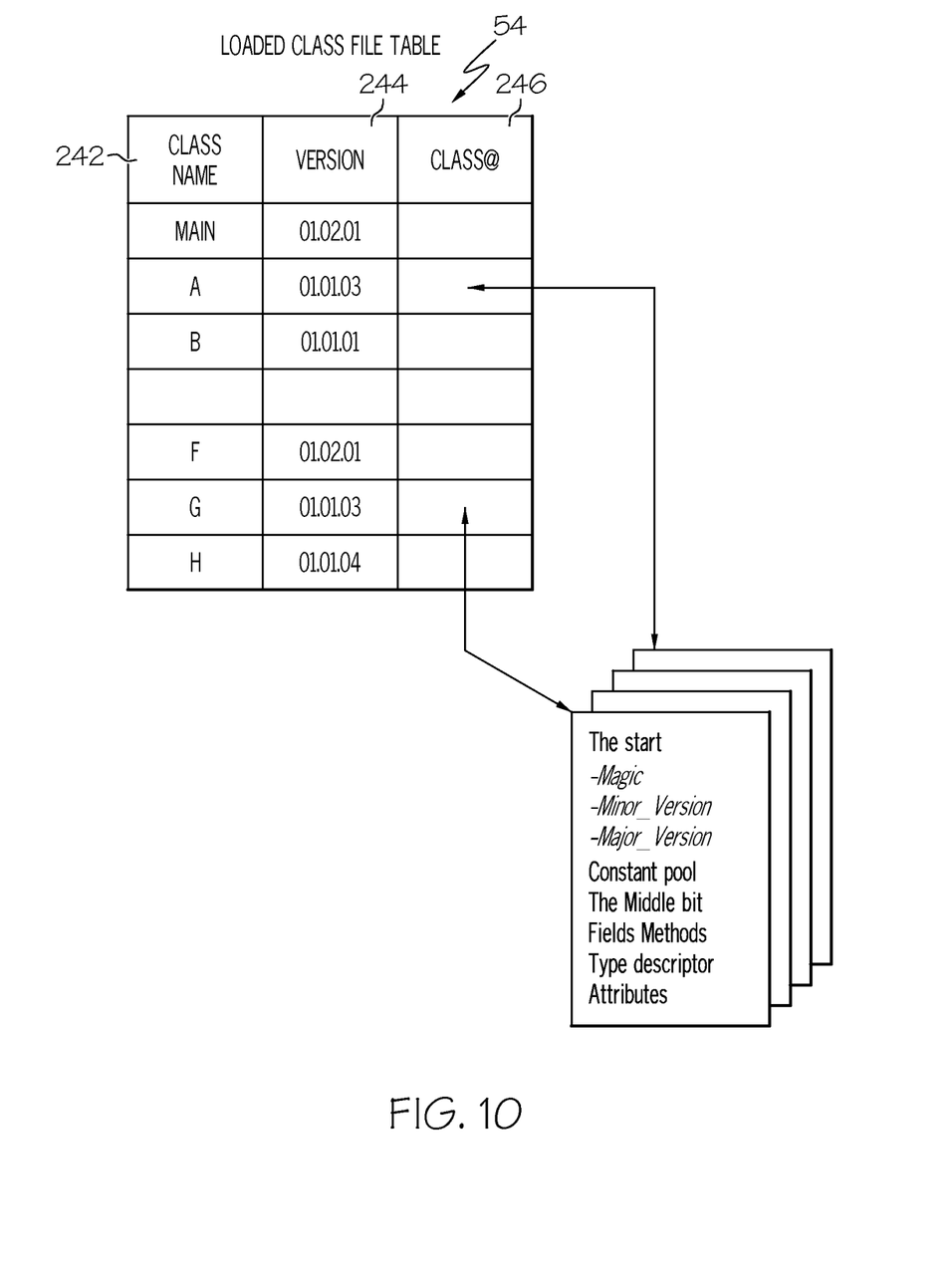
FIG. 10 is a schematic of an exemplary loaded class file table.

Referring to FIG. 10, an exemplary loaded class file table 54 indicating class files loaded into the local memory 27 of the computer 20 for execution thereof is illustrated. The loaded class file table 54 includes a class name field 242 and a version number field 244. The computer 20 generates the loaded class file table 54 based on the called class file table 52 and the class files in a particular application.

Figure 11:
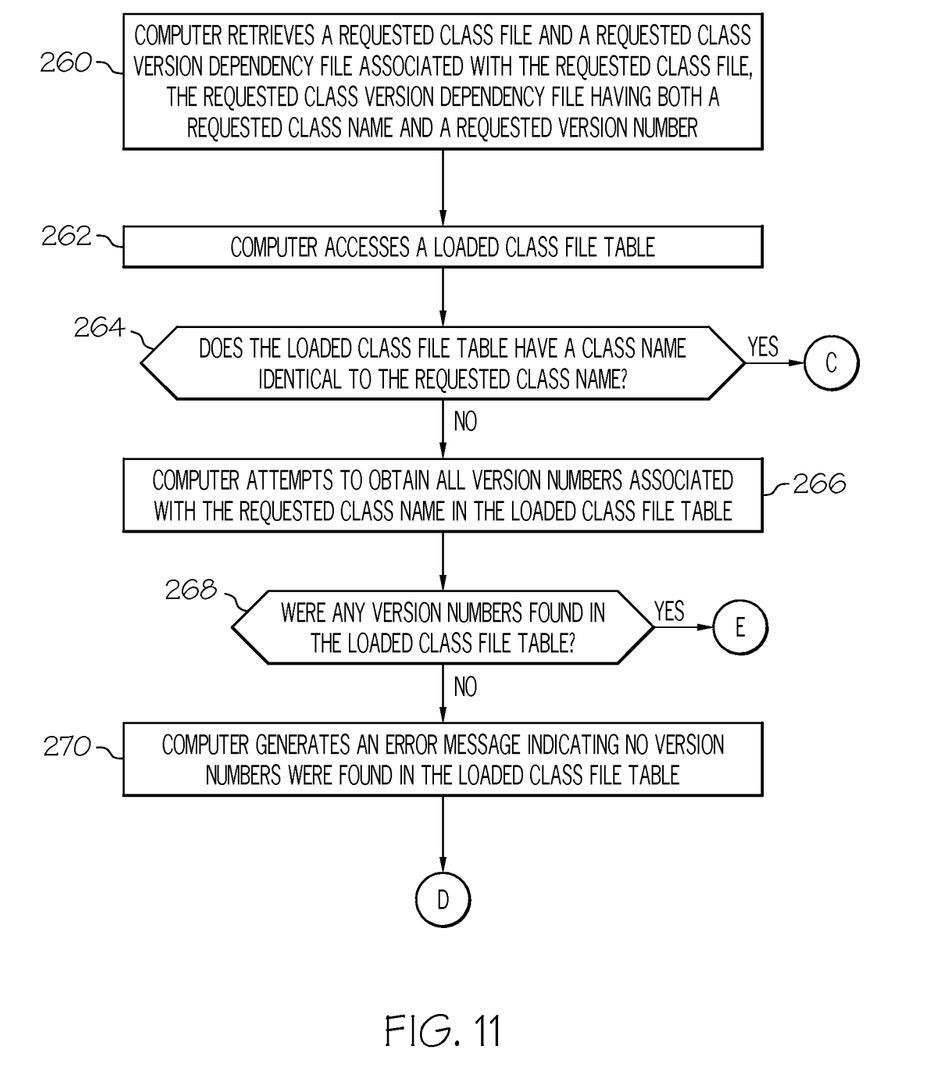
FIGS. 11 and 12 are flowcharts of a method for detecting a version conflict between a requested class file and a loaded class file in accordance with another exemplary embodiment.
Figure 12:
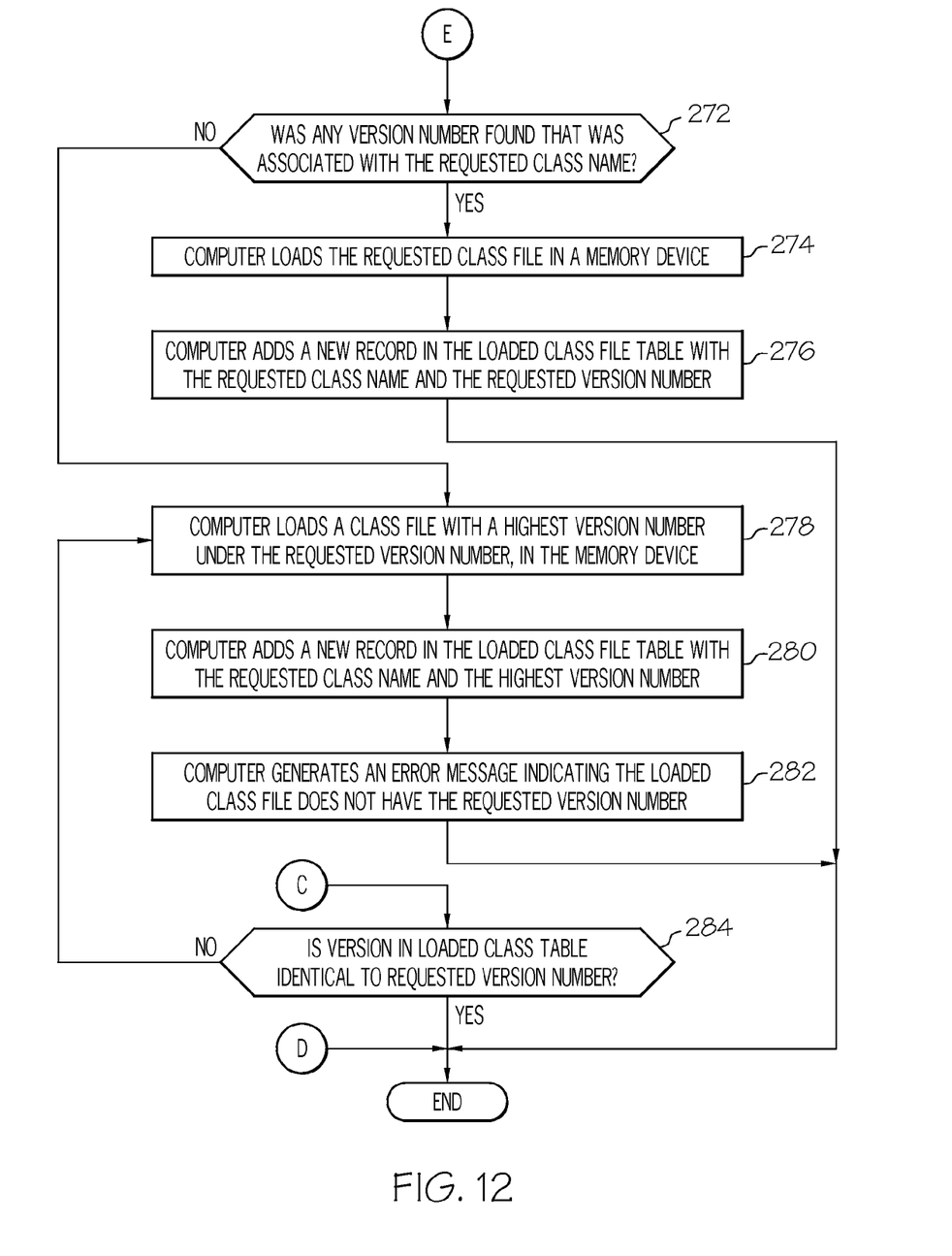

Referring to FIGS. 11 and 12, a flowchart of the method for detecting a version conflict between a requested class file and a loaded class file in accordance with another exemplary embodiment.

At step 260, the computer 20 retrieves a requested class file and a requested class version dependency file associated with the requested class file. The requested class version dependency file has both a requested class name and a requested version number.

At step 262, the computer 20 accesses the loaded class file table 54.

At step 264, the computer 20 makes a determination as to whether the loaded class file table 54 has a class name identical to the requested class name. If the value of step 264 equals "yes", the method advances to step 284. Otherwise, the method advances to step 262.

At step 266, the computer 20 attempts to obtain all version numbers associated with the requested class name in the loaded class file table 54. After step 266, the method advances to step 268.

At step 268, the computer 20 makes a determination as to whether any version numbers were found in the loaded class file table 54. If the value of step 268 equals "yes", the method advances to step 272. Otherwise, the method advances to step 270.

At step 270, the computer 20 generates an error message indicating no version numbers were found in the loaded class file table 54. The error message is displayed on the display device 26. After step 270, the method advances to step 272.

At step 272, computer 20 makes a determination as to whether any version number was found that was associated with the requested class name. If the value of step 272 equals "yes", the method advances to step 274. Otherwise, the method advances to step 278.

At step 274, the computer 20 loads the requested class file in the local memory device 27. After step 274, the method advances to step 276.

At step 276, the computer 20 adds a new record in the loaded class file table 54 with the requested class name and the requested version number. After step 276, the method is exited.

Referring again to step 272, if the value of step 272 equals "no", the method advances to step 278. At step 278, the computer 20 loads a class file with a highest version number under the requested version number, in the local memory device 27. After step 278, the method advances to step 280.

At step 280, the computer 20 adds a new record in the loaded class file table 54 with the requested class name and the highest version number. After step 280, the method advances to step 282.

At step 282, the computer 20 generates an error message indicating the loaded class file 54 does not have the requested version number. The error message is displayed on the display device 26. After step 282, the method is exited.

Referring again to step 264, if the value of step 264 equals "yes", the method advances to step 284. At step 284, the computer 20 makes a determination as to whether the version number in the loaded class table 54 is identified to the requested version number. If the value of step 284 equals "yes", the method is exited. Otherwise, the method returns to step 278.

The above-described methods can be at least partially embodied in the form of one or more computer readable media having computer-executable instructions for practicing the methods. The computer-readable media can comprise one or more of the following: floppy diskettes, CD-ROMs, hard drives, flash memory, and other computer-readable media known to those skilled in the art; wherein, when the computer-executable instructions are loaded into and executed by one or more computers the one or more computers become an apparatus for practicing the invention.

The system and the method for loading a called class file table represents a substantial advantage over other systems and methods. In particular, the system and the method provide a technical effect of loading the called class file table with data indicating a highest version of a class file.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method for generating a called class file table with data indicating a highest version of each of a plurality of class files associated with a main class file of a software application, comprising:

retrieving a main class version dependency file associated with the main class file, the main class version dependency file having both a first class name and a first version number associated with a first class file that is called by the main class file;

adding a first record to the called class file table having both the first class name and the first version number associated with a first class file;

retrieving a second class version dependency file associated with a second class file, the second class version dependency file having both a second class name and a second version number associated with a third class file called by the first class file or the main class file; and if the second class name is identical to the first class name in the called class file table and the second version number is higher than the first version number, then updating the first record in the called class file table with the second class name and the second version number associated with the third class file.

2. The method of claim 1, further comprising:

if the second class name is not identical to the first class name in the called class file table, then adding a second record to the called class file table having the second class name and the second version number.

3. A system for generating a called class file table with data indicating a highest version of each of a plurality of class files associated with a main class file of a software application, comprising:

a memory device;

a computer operably communicating with the memory device, the computer configured to retrieve a main class version dependency file associated with a main class file from the memory device, the main class version dependency file having both a first class name and a first version number associated with a second class file that is called by the first class file;

the computer further configured to add a first record to the called class file table having both the first class name and the first version number associated with a first class file;

the computer further configured to retrieve a second class version dependency file associated with a second class file, the second class version dependency file having both a second class name and a second version number associated with a third class file called by the first class file or the main class file; and the computer further configured to update the first record in the called class file table with the second class name and the second version number associated with the third class file if the second class name is identical to the first class name in the called class file table and the second version number is higher than the first version number.

4. The system of claim 3, wherein the computer is further configured to add a second record to the called class file table having the second class name and the second version number, if the second class name is not identical to the first class name in the called class file table.

* * * * *